July 11, 1961 S. WOMER 2,991,735
STRIPPER WIRE MOUNTING FOR DOUGH CUTTING MACHINE
Filed Sept. 3, 1959
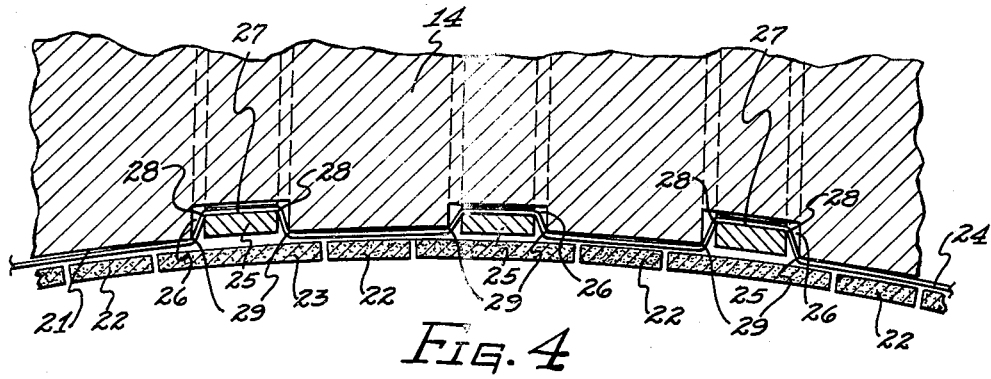
FIG. 4
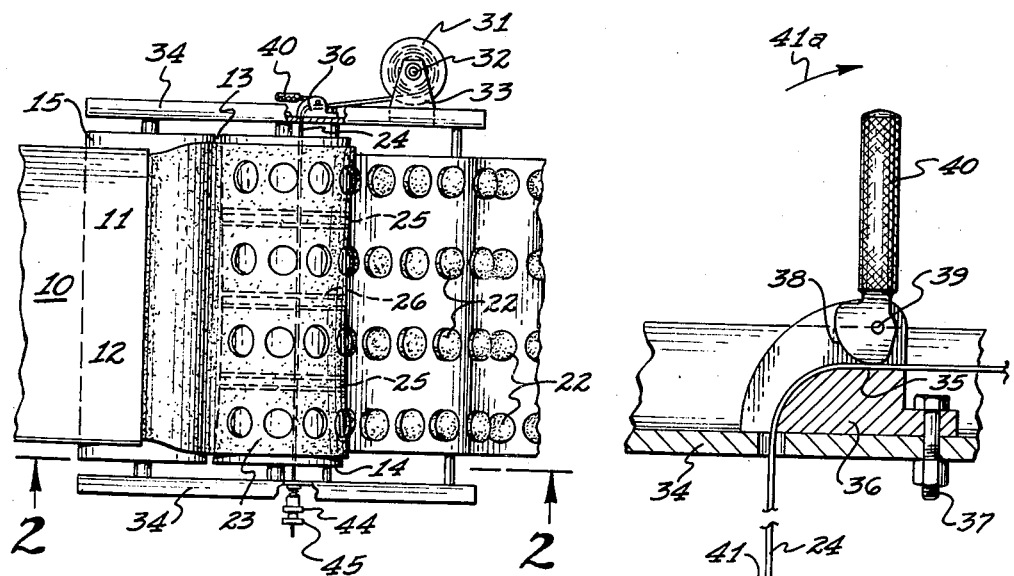
FIG. 1
FIG. 3
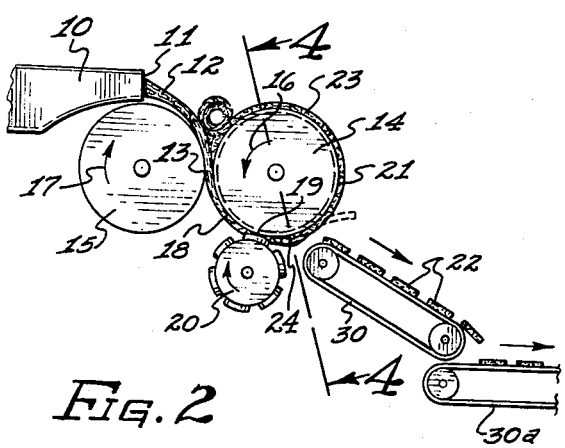
FIG. 2
INVENTOR.
STANLEY WOMER
BY
*Willard S. Growe*
ATTORNEY.

United States Patent Office 2,991,735
Patented July 11, 1961

2,991,735
STRIPPER WIRE MOUNTING FOR DOUGH CUTTING MACHINE
Stanley Womer, Phoenix, Ariz., assignor to Fiesta Foods Corporation, Phoenix, Ariz., a corporation of Arizona
Filed Sept. 3, 1959, Ser. No. 837,858
5 Claims. (Cl. 107—12)

This invention pertains to improvements in dough cutting machines and is particularly directed to an improved stripper wire mounting for such machines.

One of the objects of this invention is to provide means for readily continuously adjusting new sections of stripper wire in relation to a dough cutting machine roll structure.

Still another object of this invention is to provide a mounting means whereby the dough cutting machine need not be shut down while bringing new and unworn portions of stripper wire to operative position in a dough cutting machine.

Still another object of this invention is to provide a unique stripper wire supporting arrangement for easily moving new sections of wire to operative position and maintaining the proper tension in said wire when so adjusted.

Further features and advantages of this invention will appear from a detailed description of the drawings in which:

FIG. 1 is an enlarged fragmentary plan view showing a dough cutting machine mechanism incorporating the features of the stripper wire mounting of this invention.

FIG. 2 is an end elevation on the line 2—2 of FIG. 1.

FIG. 3 is an enlarged fragmentary view particularly showing the stripper wire support and mounting elements.

FIG. 4 is an enlarged fragmentary section on the line 4—4 of FIG. 2.

As an example of one embodiment of this invention there is shown a dough cutting machine having the usual dough discharge chute 10 on frame 34 having the discharge opening 11 from which issues the prepared dough 12 from which it flows into the confined space 13 formed between the dough divider roll 14 and the back up roll 15 journaled on frame 34 and suitably driven to rotate in the direction indicated by the arrows 16 and 17. The dough then follows the periphery 18 of the roll 14 and passes through the cutting space 19 between the roll 14 and the cutting die roll 20 journaled on frame 34.

The perforated dough continues to follow the periphery 21 of the roll 14 and suitable means must be provided to separate the cut-out wafers 22 from the dough slab 23. To this end there is provided a stripper wire 24 which extends longitudinally of the peripheral portion 21 of the roll 14 and is held thereagainst by a series of axially spaced rings 25 carried in annular grooves 26 formed in the roll 14. The stripper wire 24 goes through the bores 27 in the rings 25 over the edges 28 of the rings and against the edges 29 of the roll 14 so that as the roll 14 turns the stripper wire riding against the peripheral portion 21 thereof separates the cut-out wafers 22 from the dough slab and allows the wafers to drop on suitable conveyors 30 and 30a for further progressing in subsequent steps.

Because of wear of engagement of the stripper wire 24 with the roll periphery and at the points 28 and 29, the stripper wire is subject to frequent breakage and replacement. In the past this has required shutting down of the machine and the tedious time-consuming problem of threading the wire through the rings 25. In the instant arrangement the continuous supply of stripper wire 24 is provided from the spool 31 journaled on a suitable shaft 32 carried on the bracket 33 fixed to the frame 34 of the dough cutting machine at one end of the roll 14. The wire 24 from the spool 31 passes over the abutment surface 35 of the clamp block 36 fixed to the frame 34 by a suitable bolt 37. A locking cam 38 pivotally mounted on a pin 39 in the block 36 has an operating handle 40 which when swung in the direction of the arrow 41a clamps the stripper wire 24 to the block 36.

At the opposite end of the roll 14 the stripper wire 24 passes through the bore 41 in the frame 34, an abutment washer 42, a compression spring 43, the tensioning knob 44 and the pull knob 45 to which it is secured by a suitable set screw 46. When it is desired to present a new length of wire to the roll 14, the operator releases the clamp lever 40 and set screw 46 and pulls the desired amount of wire through the roll 14 and rings 25 and then swings lever 40 to clamped position and locks setscrew 46 on the wire 24. Tensioning knob 44 which threadedly engages the pull knob 45 at 47 is then rotated building up the proper tension through the spring 43 and washer 42 against the frame 34 for proper functioning of the stripper wire with the roll 14. The worn piece of wire projecting from the pull knob 45 is then snipped off and discarded. Thus, wire may be continually advanced into stripping position without shutting down the machine for rethreading the roll 14 and rings 25 as in past structures.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed and desired to be obtained by United States Letter Patent is:

1. A stripper wire device for a dough cutting machine having a frame, a dough divider roll journaled on said frame having annular grooves therein, and stripper wire guide rings in said grooves wherein said stripper wire mounting includes a stripper wire supply spool on said frame, a releasable stripper wire clamp on said frame at one side of said dough divider roll adapted to receive a supply of wire from said supply spool, said stripper wire extending from said clamp longitudinally of said roll and through said rings to the other side thereof, and a releasable tensioning device on said frame on said other side of said roll.

2. In a stripper wire mounting device as set forth in claim 1 wherein said releasable tensioning device includes a pull knob releasably connectable to said stripper wire, a tensioning knob threadedly connected to said pull knob and movable axially on said threaded connection relative to said pull knob, and a compression spring means between said frame and said tensioning knob.

3. In a stripper wire mounting device as set forth in claim 2 wherein said clamp includes an eccentric cam pivotally mounted on said frame acting against said wire to clamp the same against an abutment surface fixed on said frame, and an operating handle to release and clamp said cam when said tensioning device is released.

4. In a stripper wire device for a dough cutting machine, the combination of: a frame; a roller rotatably mounted thereon and having a dough carrying peripheral surface; a stripper wire mounted adjacent said peripheral surface and disposed to separate dough therefrom; a supply spool on which an integral portion of said stripper wire is wound, said spool disposed beyond a first end of said roller, said stripper wire extending beyond an opposite end of said roller; first holding means engaged with said stripper wire between said spool and said first end of said roller; and tensioning means engaged with and holding said wire and located beyond the opposite end of said roller.

5. In a stripper wire device for a dough cutting machine, the combination of: a frame; a roller rotatably mounted thereon and having a dough carrying peripheral surface; a stripper wire mounted adjacent said peripheral surface and disposed to separate dough therefrom; a supply spool on which an integral portion of said stripper wire is wound, said spool disposed beyond a first end of said roller, said stripper wire extending beyond an opposite end of said roller; first holding means engaged with said stripper wire between said spool and said first end of said roller; and tensioning means engaged with and holding said wire and located beyond the opposite end of said roller, said tensioning means comprising a second wire holding means; and resilient means tending to force said second wire holding means in a direction to create tension in said wire between said first holding means and said tensioning means.

References Cited in the file of this patent

UNITED STATES PATENTS

| | | |
|---|---|---|
| 2,603,495 | Hermanson | July 15, 1952 |
| 2,666,399 | Pereyra | Jan. 19, 1954 |